United States Patent
Grob-Lipski et al.

(10) Patent No.: US 8,200,224 B2
(45) Date of Patent: Jun. 12, 2012

(54) HANDOVER METHOD AND APPARATUS THEREOF

(75) Inventors: Heidrun Grob-Lipski, Starzach (DE); Stephen Kaminski, Eislingen (DE); Hajo-Erich Bakker, Eberdingen (DE)

(73) Assignee: Alcatel Lucent, Paris (FR)

( * ) Notice: Subject to any disclaimer, the term of this patent is extended or adjusted under 35 U.S.C. 154(b) by 238 days.

(21) Appl. No.: 12/648,055

(22) Filed: Dec. 28, 2009

(65) Prior Publication Data

US 2010/0167744 A1 Jul. 1, 2010

(30) Foreign Application Priority Data

Dec. 29, 2008 (EP) .................................... 08291252

(51) Int. Cl.
*H04W 36/08* (2009.01)
(52) U.S. Cl. ........ 455/436; 455/437; 455/438; 455/439; 455/442; 370/216; 370/254; 370/331
(58) Field of Classification Search .......... 455/436–439, 455/442; 370/216, 254, 331
See application file for complete search history.

(56) References Cited

U.S. PATENT DOCUMENTS

| 6,055,427 | A | 4/2000 | Ojaniemi | |
| 7,818,006 | B2 * | 10/2010 | Kim et al. | 455/436 |
| 2007/0161374 | A1 | 7/2007 | Kienstra et al. | |
| 2007/0293225 | A1 * | 12/2007 | Kangude et al. | 455/436 |
| 2008/0268850 | A1 * | 10/2008 | Narasimha et al. | 455/437 |
| 2009/0111470 | A1 * | 4/2009 | Thakare | 455/436 |

FOREIGN PATENT DOCUMENTS

EP 1 995 981 A1 11/2008

\* cited by examiner

*Primary Examiner* — Charles Appiah
*Assistant Examiner* — Michael Vu
(74) *Attorney, Agent, or Firm* — Fay Sharpe LLP

(57) ABSTRACT

The invention relates to a handover method in a base station of a mobile communication system, the mobile communication system further comprising a plurality of base stations. A telecommunication link being established between a user equipment and the base station, the method comprises: receiving a first measurement report from the user equipment; selecting a first candidate base station using the evaluation of the signal quality from the first measurement report; initiating a first handover preparation by transmitting a first request to the first candidate base station; determining if the first handover preparation has failed; selecting a set of candidate base stations including at least some of the candidate base stations identified in the first measurement report; initiating a second handover preparation by transmitting a second handover request to at least one of the set of candidate base stations, if the first handover preparation has failed; selecting a target base station from the set of candidate base stations, if the second handover preparation has not failed; initiating the handover of the user equipment from the base station to the target base station.

15 Claims, 6 Drawing Sheets

HANDOVER METHOD AND APPARATUS THEREOF

BACKGROUND OF THE INVENTION

The invention is based on a priority application EP08291252.8 which is hereby incorporated by reference.

The invention relates to a handover method in a base station of a mobile communication system, to a base station and to a computer program product.

In a cellular network, a cell typically has several neighboring cells. The handover procedure allows the continuation of a call when a user equipment crosses the border of one cell to another. The basic concept of handover is that when a user terminal moves from the coverage area of one cell to another, a new connection to the target cell is set up and the connection to the old cell may be released. During the handover, data interruption may occur caused by delays in signaling message, or cause by problems during the signaling with the candidate base station and the source base station.

In general, when a user equipment moves from one cell to another in a cellular radio system and the handover is performed, the handover may be described as a hard handover or a soft handover. During the hard handover, the old connection is broken before a new one is set up. Therefore, handover margins are used in order to diminish the problem of data interruption. However, the base station connection cannot be utilized in such a case due to the handover margin and the delay of the handover procedure. During the soft handover, updating margins are also employed.

Further, a pilot signal is used to identify a base station and to form an active set in a mobile communication system. The pilot signal is continuously transmitted by each base station to its coverage area. The user equipment can identify the base stations on the basis of the pilot signal, since the signals differ from one another. The user equipments continuously measure pilot signals and maintains a measurement list of the base stations and the corresponding signal quality levels of the pilot signals that are situated near the user equipment and that are possible candidates for handover or connection establishment.

The base stations on the measurement list form a group of candidates that may become members of the active set. User equipments may monitor the pilot signals of only those base stations that are on the measurement list. When a user equipment moves, the measurement list is updated as the need arises. The updating process is performed according to the measurements of the user equipment based on the strength of the pilot signal. That means that if a pilot signal transmitted by a base station is received with adequate strength, it is added to the measurement list.

SUMMARY OF THE INVENTION

The invention relates to a handover method in a base station of a mobile communication system, the mobile communication system further comprising a plurality of base stations. A telecommunication link being established between a user equipment and the base station, the method comprises: receiving a first measurement report from the user equipment (UE) via the telecommunication link, the first measurement report containing an evaluation of signal quality from at least one candidate base station of the plurality of base stations for a handover; selecting a first candidate base station using the evaluation of the signal quality from the first measurement report; and initiating a first handover preparation by transmitting a first request to the first candidate base station.

The method further comprises: determining if the first handover preparation has failed; selecting a set of candidate base stations including at least some of the candidate base stations identified in the first measurement report; initiating a second handover preparation by transmitting a second handover request to at least one of the set of candidate base stations, if the first handover preparation has failed; selecting a target base station from the set of candidate base stations, if the second handover preparation has not failed; and initiating the handover of the user equipment from the base station to the target base station. The first and the second request are indicative of a set of radio bearers used by the user equipment.

The term 'base station' as used herein refers to any type of fixed network element capable of exchanging data with a user equipment. The term "user equipment" as used herein refers to any type of fixed or mobile (or portable) communication terminal capable of exchanging data with a radio-communication network on a radio communication link. Consequently, it may be, among other things, a telephone or desktop computer connected to a local router or server and equipped with a radio communication interface; a mobile telephone; a laptop computer or personal digital assistant (or PDA) equipped with a radio communication interface; a server or local router equipped with a radio communication interface; a high-frequency radio receiver; or a terrestrial or satellite television receiver.

One of the advantages of the embodiments is that it allows a rapid switching to an alternative base station in case that any stage of the handover of the user equipment fails, caused by a handover or radio link failure. By initiating a multiple handover preparation triggered by an admission failure in the target base station, the base station ensures finding the best possible candidate that is able of support all or most of radio bearers or services used by the user equipment in the base station, as the algorithm may choose among a set of base stations that sent handover acknowledgement.

In accordance with an embodiment, the first handover preparation has failed if a failure message is received from the first candidate base station or if a first predefined time has expired since the transmission of the first handover request.

In accordance with an embodiment, a second measurement report is received from the user equipment. The second measurement report contains a second evaluation of signal quality of at least one candidate base station. The set of candidate base stations for the second handover preparation includes at least some of the candidate base stations identified in the second measurement report.

In accordance with an embodiment, the set of candidate base stations for the second handover preparation includes at least one candidate base stations of the set of candidate base stations. The at least some candidate base stations are selected using statistics data collected from previous handover preparations related to the base station.

In accordance with an embodiment, the target base station is a candidate base station indicated in the statistics data with a highest percentage of previous successful handovers.

In accordance with an embodiment, a third measurement report is received from the user equipment before the handover is initiated, the method further comprising: sending a third handover preparation to at least an alternative candidate base station from the third measurement report.

In accordance with an embodiment, the target base station is selected after reception of a first handover acknowledgement message from the target base station by the base station. The second handover preparation has not failed if at least the first handover acknowledgement message is received by the base station.

In accordance with an embodiment, the target base station is selected from a subset of the set of candidate base stations. The subset of candidate base stations includes candidate base stations which have sent handover acknowledgement messages to the base station.

In accordance with an embodiment, the target base station is selected from the subset of candidate base stations which has accepted supporting the set of radio bearers being used by the user equipment.

In accordance with an embodiment, the target base station is selected from the subset of candidate base station which has accepted supporting a maximum number of radio bearers from the set of radio bearers being used by the user equipment.

In accordance with an embodiment, the method further comprises:
setting a second predefined time after transmitting the second handover request. The selecting the target base station step further comprises selecting the target base station which sends a handover acknowledgement message to the base station, if only the handover acknowledgement message is received by the base station during the second predefined time. Further, the selecting the target base station step further comprises selecting the target base station which has accepted supporting the complete set of radio bearers being used by the user equipment, wherein the target base station is selected from a subset of the set of candidate base stations, wherein the subset includes candidate base stations which have sent handover acknowledgement messages to the base station, if more than one handover acknowledgement messages is received by the base station.

In accordance with an embodiment, the selecting the target base station step further comprises: selecting the target base station which has a maximum number of radio bearers being used by the user equipment, wherein the target base station is selected from the subset of the set of candidate base stations, if no candidate base station from the subset accepts supporting the set of radio bearers being used by the user equipment.

In accordance with an embodiment, the selecting the target base station step further comprises selecting the target base station from statistics collected from previous handover preparations, if the second predefined time expires and if no handover acknowledgement messages is received within the second predefined time.

In another aspect, the invention relates to a base station being operable to perform a method in accordance with any one of the preceding embodiments.

In another aspect, the invention relates to a computer program product stored on a storage medium, comprising executable program means for causing a base station to perform a method according to any of the preceding embodiments when the program is run on the base station.

BRIEF DESCRIPTION OF THE DRAWINGS

In the following preferred embodiments of the invention will be described in greater detail by way of example only making reference to the drawings in which.

DETAILED DESCRIPTION

Figure 1:
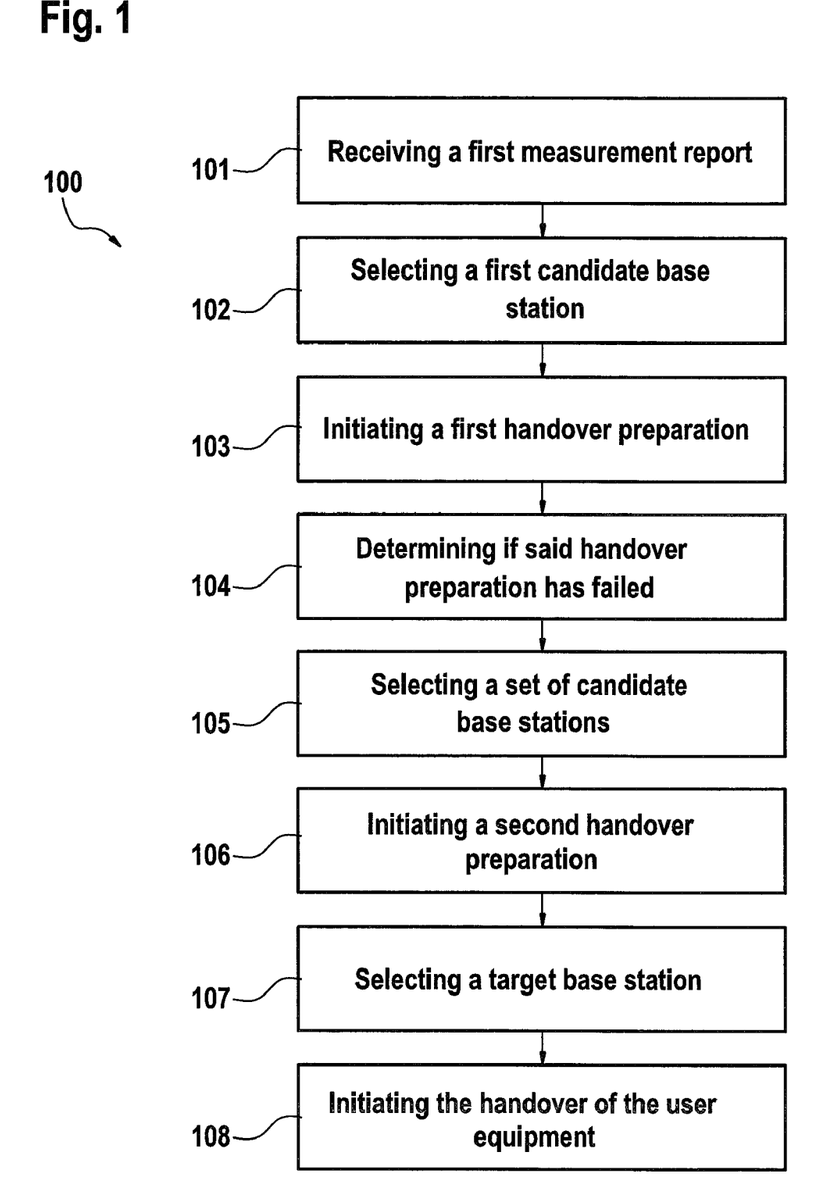
FIG. 1 illustrates a flowchart of an embodiment of a handover method in a base station of a mobile communication system.

FIG. 1 shows a flowchart 100 of a handover method in a base station of a mobile communication system. The mobile communication system further comprises a plurality of base stations. A telecommunication link is established between a user equipment and the base station. The method in a first step 101 receives a first measurement report from the user equipment via the telecommunication link. This measurement report contains an evaluation of signal quality from the candidate base stations of the plurality of base stations for a handover. In a second step 102, a first candidate base station is selected using the evaluation of the signal quality from the first measurement report.

The evaluation may indicate that the first candidate base station has the highest signal strength for the user equipment. In a third step 103, a first handover preparation is initiated by transmitting a first request to the first candidate base station. In a fourth step 104, it is determined if the first handover preparation has failed. The first handover preparation has failed, if a failure message is received from the first candidate base station, or if a first predetermined time has expired since the transmission of the first handover request. The failure message may indicate that the first candidate base station is not available to support any of the radio bearers used by the user equipment.

In a fifth step 105 a set of candidate base stations is selected, the set including at least some of the candidate base stations identified in the first measurement report. In a sixth step 106, a second handover preparation is initiated by transmitting a second handover request to the set of candidate base stations, if the first handover preparation has failed. The second handover preparation may be defined as a multiple handover preparation, as multiple base stations may be prepared from the base station.

In a seventh step 107, the target base station is selected from the set of candidate base stations, if the second handover preparation is successful, or in other way, if the second handover preparation has not failed. The target base station may be selected from a subset of the set of candidate base stations which have sent handover acknowledgement messages to the base stations, and wherein the handover acknowledgement messages have been successfully received by the base station. In the case that a single acknowledgement message has been received by the base station during a predefined time, then the candidate base station which sent the single acknowledgement message will be selected as the target base station.

In an eighth step 108, the handover of the user equipment is initiated from the base station to the target base station. The first and the second request are indicative of a set of radio bearers used by the user equipment. The set of radio bearers may be taken into account during the selection process of the target base station, especially if the base station receives more than one acknowledgement message from the set of candidate base stations.

Figure 2:
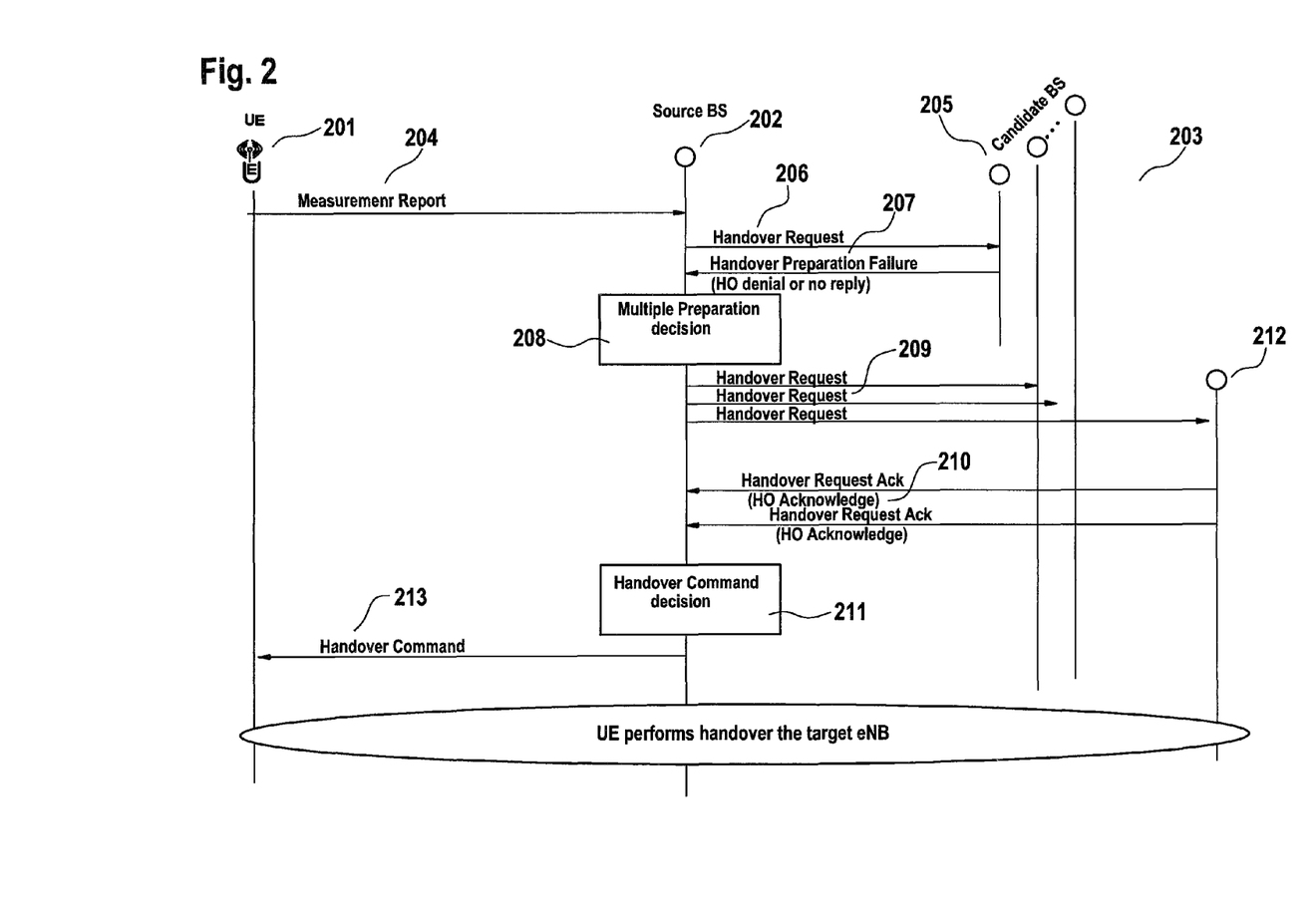
FIG. 2 illustrates an embodiment of the signaling during the handover method according to the embodiments.

FIG. 2 shows a signaling between a user equipment 201, a source base station 202 and a set of candidate base stations 203.

The user equipment 201 transmits a measurement report 204 to the source base station 202, which corresponds to the base station with an established link with the user equipment

201. The source base station 202 compiles a candidate list of base stations with the information received in the measurement report 204, that may indicate or trigger a handover to a target base station. In a first instance, the source base station 202 transmits a first handover request to a first candidate base station 205. The candidate base station 205 may correspond to the candidate base station from the list that has the strongest signal for the user equipment 201. In the case that the first candidate base station 205 is not able to accept the handover request, it sends a handover preparation failure message 207 back to the source base station 202. A handover preparation failure may also be the result of receiving no reply from the first candidate base station 205.

The detection of the failure of the first handover preparation, triggers a preparation decision 208 that initiates a second handover preparation 209 to at least one base station from said set of candidate base stations. The source base station 202 transmits a second handover request 209 to the set of candidate base stations 203 and waits for the response from the set of candidate base stations. If at least two 'handover request acknowledgements' 210 are received by the source base station 202, a handover command decision 211 is triggered. The handover command decision entity 211 selects a target base station from a subset of the set of candidate base stations, wherein the subset corresponds to the candidate base stations that sent handover request acknowledgements and whose handover request acknowledgements 210 were successfully received by the source base station 202. Further, the handover of the user equipment from the source base station 202 to the target base station 212 is initiated by sending a handover command 213 to the user equipment 201. When the user equipment 201 receives the handover command 213, the user equipment 201 performs the handover to the target base station 212.

Figure 3:
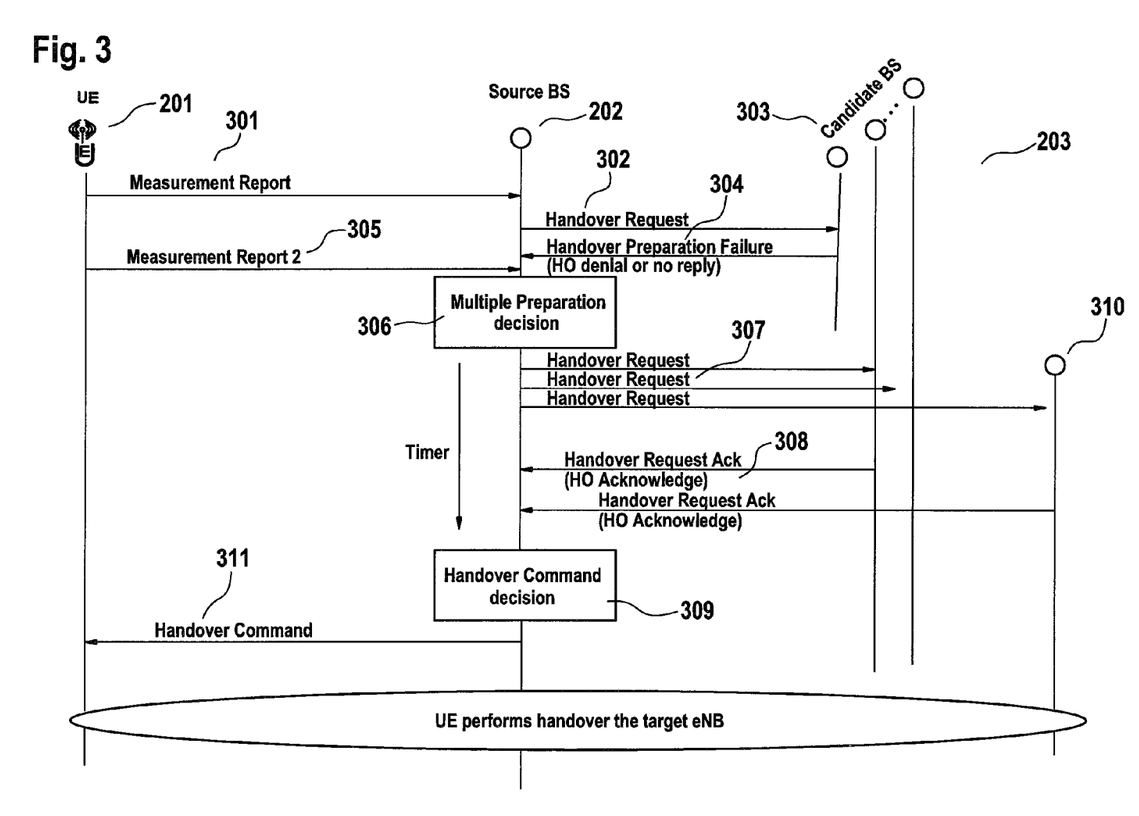
FIG. 3 illustrates an embodiment of the signaling between the user equipment and the base stations during the handover method of the embodiments.

FIG. 3 shows an embodiment of the signaling in the handover method between a user equipment 201, the source base station 202 and a set of candidate base stations 303.

The transmission of a measurement report 301 by the user equipment and received by the source base station 202 may trigger a first handover preparation as a result of the content of the evaluation of signal quality from the set of candidate base stations. The source base station 202 selects a first candidate base station 303 using the evaluation of the signal quality from the first measurement report 301 and transmits a first handover request 302 to the first candidate base station 303. If the source base station 202 detects a handover preparation failure 304, the source base station 202 may receive a second measurement report 305 transmitted by the user equipment 201. The second measurement report 305 contains a second evaluation of signal quality of candidate base stations that may be taken into account during the multiple preparation decision step 306. The selected set of candidate base stations during the initiation of a second handover preparation may include some of the candidate base stations identified in the second measurement report 305.

Then, the source base station 202 transmits a second handover request 307 to the selected set of candidate base stations, as the first handover preparation has failed. After the first handover requests are sent to the set of candidate base stations, a timer may be set up during a predetermined time. During this time, the handover request acknowledgements 308 are received from some of the candidate base stations by the source base station 202. A handover command decision 309 starts the selection of the target base station from the subset of the set of candidate base stations that transmitted the handover request acknowledgement 308.

The target base station 310 selected during the handover command decision 309 may correspond to the candidate base station that accepted supporting the complete set of radio bearers being used by the user equipment 201. Alternatively, the target base station 310 selected during the handover command decision 309 may correspond to the candidate base station that accepts supporting a maximum number of radio bearers from the set of radio bearers being used by the user equipment. The selected target base station 310 corresponds to one of the candidate base stations that sent one of the handover request acknowledgements 308.

After the target base station 310 selection, the source base station 202 transmits a handover command 311 to the user equipment. The user equipment, after reception of the handover command, performs a handover to the target base station 310.

Figure 4:
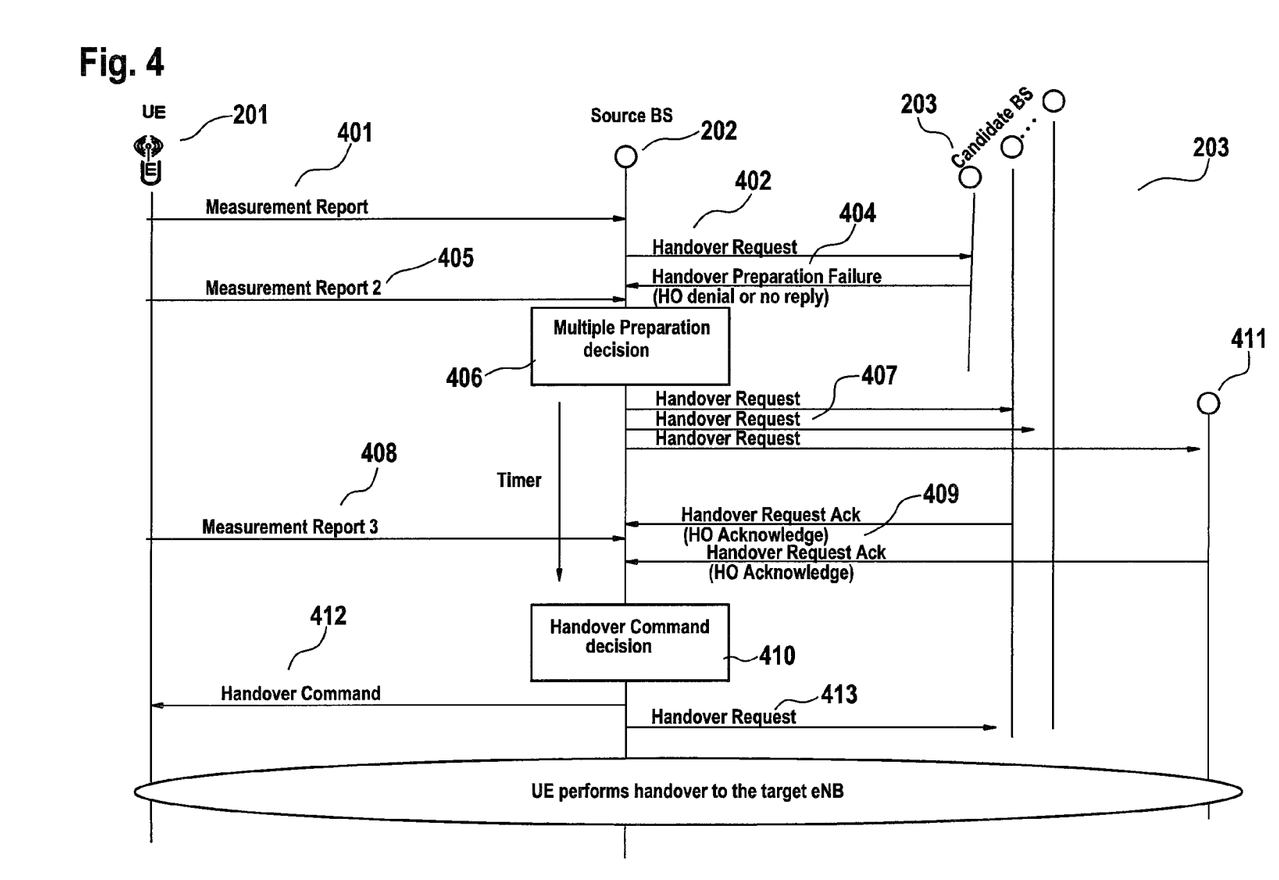
FIG. 4 shows an embodiment of the signaling embodiment during the handover method.

FIG. 4 shows the signaling of the handover method between a user equipment 201, a source base station 202 and a set of candidate base stations 203. A measurement report 401 triggers the initiation of a handover preparation by the source base station 202. The source base station 202 transmits a handover request 402 to a first candidate base station 403 that has been selected using the evaluation contained in the measurement report 401. The source base station 202 may detect a handover preparation failure 404, if the first candidate base station 403 transmits a failure message or if no reply is received from the first candidate base station. During this time, the source base station 202 may optionally receive a second measurement report 405, which may be used as an input during the multiple preparation decision 406.

The multiple preparation decision 406 selects a set of candidate base stations and initiates a multiple handover procedure by transmitting handover request 407 to the set of candidate base stations. The source base station 202 may optionally start a timer with a predefined time. During the predefined time, the source base station 202 may receive a third measurement report 408 from the user equipment 201 containing the third evaluation of the candidate base stations that are neighboring the user equipment. During this time one or more handover request acknowledgements 409 are received from a subset of the set of candidate base stations where it is specified the acceptance of the handover request and the number of radio bearers that are supported by the candidate base stations.

With this information, the handover command decision 410 selects a target base station 411 and transmits the information of the target base station with the handover command 412 to the user equipment 201. Based on the context of the third measurement report 408, the source base station 202 may send a further handover request 413 to an alternative candidate base station, if a certain condition is fulfilled. The condition may be for example a threshold of the signal quality of the alternative base station. The handover request 413 may be useful in case that the handover between the user equipment and the target base station 411 fails. After the reception of the handover command 412 by the user equipment 201, the user equipment 201 performs the handover to the target base station 411.

If the source base station 202 does not receive any handover request acknowledgement during the predefined time, a statistics data collected from previous handover preparations related to the source base station 202 may be used in order to select at least an alternative candidate base station to transmit the handover request. The alternative base station selected by using the statistics data may correspond to a base station with the highest percentage of previous successful handovers started from the source base station.

If the source base station 202 receives a single first handover acknowledgement message, the selected target base station corresponds to the base station that transmits this single handover acknowledgement message, and which is received by the source base station 202. If more than one handover request acknowledgement is received by the source base station 202, the candidate base station that supports the complete set of radio bearers used by the user equipment 201, or alternatively, the selected candidate base station is the base station with the maximum number of supported radio bearers. The base station forms part of a subset of the set of candidate base stations that transmitted the handover request acknowledgement.

Figure 5:
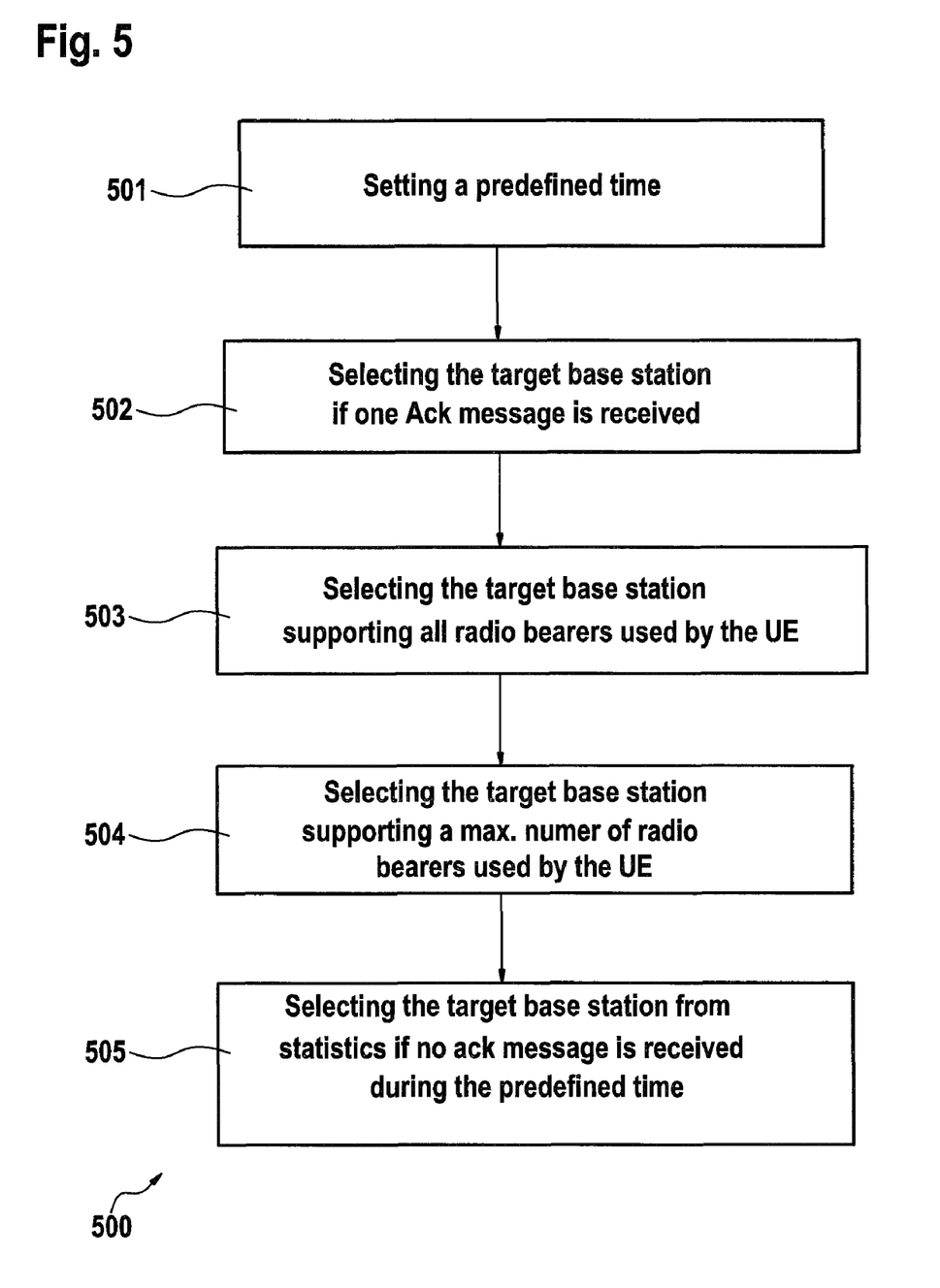
FIG. 5 shows a flowchart describing one of the embodiments.

FIG. 5 shows a flowchart 500 of an embodiment of the details in the selecting step of the target base station when the second handover preparation is successful. In a first step 501 a predefined time is set after transmitting a second handover request to the set of candidate base stations. In a second step 502, the selecting the target base station step further comprises selecting the target base station which sends a handover acknowledgement message to the base station, if the handover acknowledgement message is the only message received by the base station during the predefined time. In a third step 503, the target base station is selected as the candidate base station which has accepted supporting the complete set of radio bearers being used by the user equipment. The target base station is selected from a subset of the set of candidate base stations. The subset includes candidate base stations which have sent handover acknowledgement messages to the base station. The third step 503 is applied if more than one handover acknowledgement message is received by the base station.

In a fourth step 504 the selecting the target base station step further comprises selecting the target base station which has a maximum number of radio bearers being used by the user equipment. The selected target base station is selected from the subset of the set of candidate base stations, if no candidate base station from the subset accepts supporting the complete set of radio bearers being used by the user equipment, and if more than one handover acknowledgement message has been received by the base station.

In a fifth step 505 the selecting the target base station further comprises selecting the target base station from a statistics collected from previous handover preparations, if the predefined time expires and if no handover acknowledgement message has been received within the second predefined time by the base station.

Figure 6:
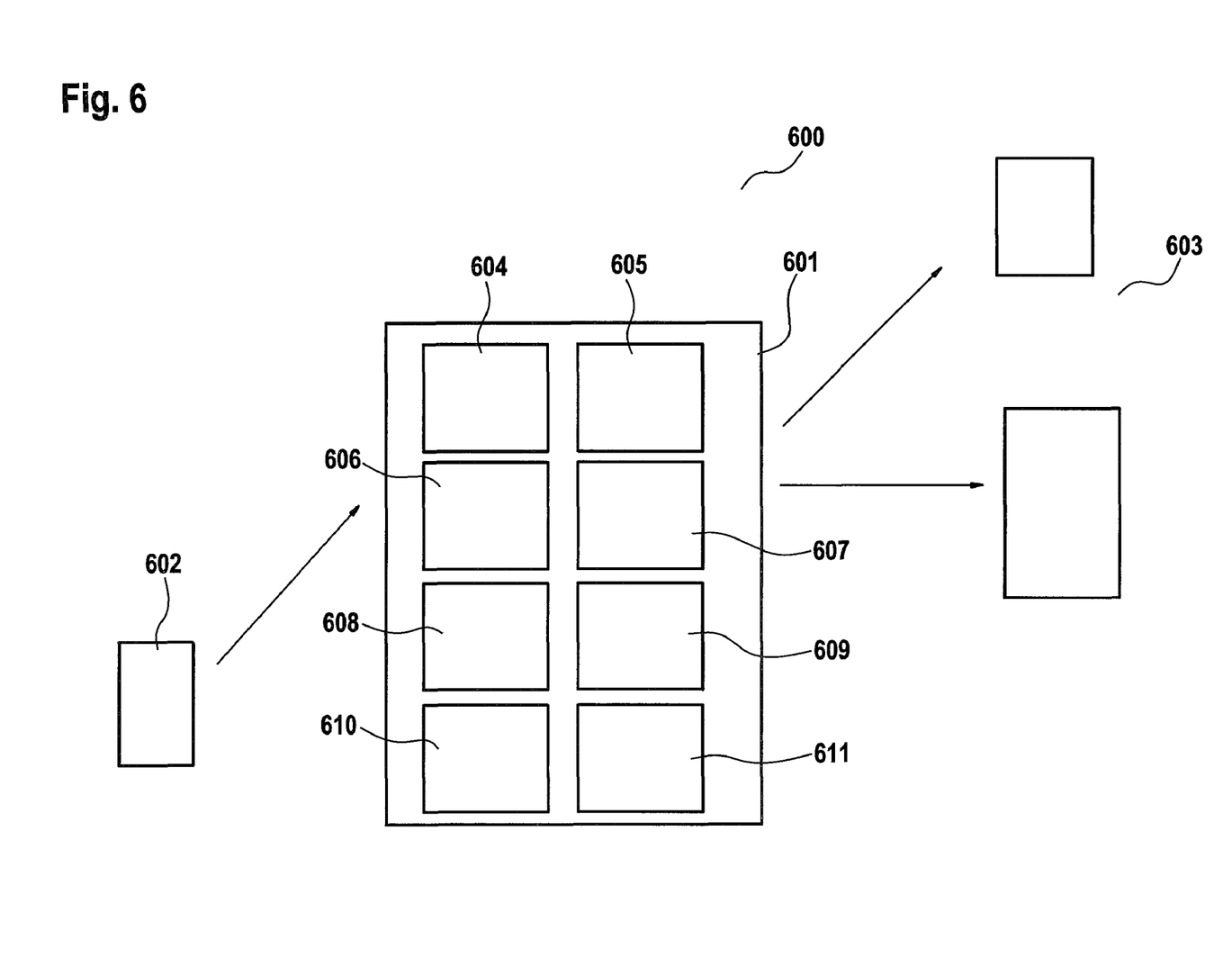
FIG. 6 shows a block diagram illustrating a base station.

FIG. 6 shows a mobile communication system 600 comprising a base station 601, with a link established with a user equipment 602, and the base station 601 coupled to a set of candidate base stations 603.

The source base station 601 comprises means for receiving 604 a first measurement report from the user equipment via the telecommunication link. The first measurement report containing an evaluation of the signal quality from candidate base stations of the plurality of base stations for handover. The source base station 601 further comprises means for selecting 605 a first candidate base station using the evaluation of the signal quality from the first measurement report; means for initiating 606 a first handover preparation by transmitting a first request to the first candidate base station; and means for determining 607 if the first handover preparation has failed.

The source base station 601 further comprises means for selecting 608 a set of candidate base stations including at least some of the candidate base stations identified in the first measurement report; means for initiating 609 a second handover preparation by transmitting a second handover request to the set of candidate base stations, if the first handover preparation has failed. The source base station 601 further comprises means for selecting 610 a target base station from the set of candidate base stations, if the second handover preparation has not failed, and means for initiating 611 the handover of the user equipment from the base station to the target base station. The first and the second request are indicative of a set of radio bearers used by the user equipment.

LIST OF REFERENCE NUMERALS

| | |
|---|---|
| 100 | Flowchart |
| 101 | First step |
| 102 | Second step |
| 103 | Third step |
| 104 | Fourth step |
| 105 | Fifth step |
| 106 | Sixth step |
| 107 | Seventh step |
| 108 | Eighth step |
| 201 | User equipment |
| 202 | Source base station |
| 203 | Candidate base station |
| 204 | Measurement report |
| 205 | First candidate base station |
| 206 | Handover request |
| 207 | Handover preparation failure |
| 208 | Multiple preparation decision |
| 209 | Handover request |
| 210 | Handover request acknowledgement |
| 211 | Handover command decision |
| 212 | Target base station |
| 213 | Handover command |
| 301 | Measurement report |
| 302 | Handover request |
| 303 | First candidate base station |
| 304 | Handover preparation failure |
| 305 | Second measurement report |
| 306 | Multiple preparation decision |
| 307 | Handover request |
| 308 | Handover request acknowledgement |
| 309 | Handover command decision |
| 310 | Target base station |
| 311 | Handover command |
| 401 | Measurement report |
| 402 | Handover request |
| 403 | First candidate base station |
| 404 | Handover preparation failure |
| 405 | Second measurement report |
| 406 | Multiple preparation decision |
| 407 | Handover request |
| 408 | Third measurement report |
| 409 | Handover request acknowledgement |
| 410 | Handover command decision |
| 411 | Target base station |
| 412 | Handover command |
| 413 | Handover request |
| 500 | Flowchart |
| 501 | First step |
| 502 | Second step |
| 503 | Third step |
| 504 | Fourth step |
| 505 | Fifth step |
| 600 | Mobile communication system |
| 601 | Source base station |
| 602 | User equipment |
| 603 | Candidate base stations |
| 604 | Means for receiving |
| 605 | Means for selecting |
| 606 | Means for initiating |
| 607 | Means for determining |
| 608 | Means for selecting |
| 609 | Means for initiating |
| 610 | Means for selecting |
| 611 | Means for initiating |

The invention claimed is:

1. A handover method in a base station of a mobile communication system, said mobile communication system further comprising a plurality of base stations, a telecommunication link being established between a user equipment and said base station, the method comprising:
   receiving a first measurement report from said user equipment via said telecommunication link, said first measurement report containing an evaluation of signal quality from at least one candidate base station of said plurality of base stations for a handover;
   selecting a first candidate base station using said evaluation of said signal quality from said first measurement report;
   initiating a first handover preparation by transmitting a first request to said first candidate base station;
   determining if said first handover preparation has failed;
   selecting a set of candidate base stations including at least some of said candidate base stations identified in said first measurement report;
   initiating a second handover preparation by transmitting a second handover request to a plurality of said set of candidate base stations, if said first handover preparation has failed;
   selecting a target base station from said set of candidate base stations, if said second handover preparation has not failed;
   initiating said handover of said user equipment from said base station to said target base station;
   wherein said first and said second request are indicative of a set of radio bearers used by said user equipment,
   wherein a second measurement report is received from said user equipment, said second measurement report containing a second evaluation of signal quality of at least one of said set of candidate base stations, wherein said plurality of candidate base stations for said second handover preparation includes at least one of said candidate base stations identified in said second measurement report.

2. The method of claim 1, wherein said first handover preparation has failed, if a failure message is received from said first candidate base station or if a first predefined time has expired since the transmission of said first handover request.

3. The method of claim 1, wherein a second measurement report is received from said user equipment, said second measurement report containing a second evaluation of signal quality of at least one candidate base stations, wherein said set of candidate base stations for said second handover preparation includes at least one of said candidate base stations identified in said second measurement report.

4. The method of claim 1, wherein said set of candidate base stations for said second handover preparation includes at least one candidate base station selected using statistics data collected from previous handover preparations related to said base station.

5. The method of claim 4, wherein said target base station is a candidate base station indicated in said statistics data with a highest percentage of previous successful handovers.

6. The method of claim 1, wherein a third measurement report is received from said user equipment before said handover is initiated, the method further comprising: sending a third handover preparation to at least an alternative candidate base station from said third measurement report.

7. The method of claim 1, wherein the target base station is selected after reception of a first handover acknowledgement message from said target base station by said base station, wherein said second handover preparation has not failed if at least said first handover acknowledgement message is received by said base station.

8. The method of claim 1, wherein said target base station is selected from a subset of said set of candidate base stations, wherein said subset of candidate base stations includes candidate base stations which have sent handover acknowledgement messages to said base station.

9. The method of claim 8, wherein said target base station is selected from said subset of candidate base stations which has accepted supporting said set of radio bearers being used by said user equipment.

10. The method of claim 8, wherein said target base station is selected from said subset of candidate base stations which have accepted supporting a maximum number of radio bearers from said set of radio bearers being used by said user equipment.

11. The method of claim 1, wherein the method further comprises:
   setting a second predefined time after transmitting said second handover request,
   wherein said selecting said target base station further comprises: selecting said target base station which sends a handover acknowledgement message to said base station, if only said handover acknowledgement message is received by said base station during said second predefined time;
   wherein said selecting said target base station further comprises: selecting said target base station which has accepted supporting said complete set of radio bearers being used by said user equipment, wherein said target base station is selected from a subset of said set of candidate base stations, wherein said subset includes candidate base stations which have sent handover acknowledgement messages to said base station, if more than one handover acknowledgement messages is received by said base station.

12. The method of claim 11, wherein said selecting said target base station further comprises:
   selecting said target base station which has a maximum number of radio bearers being used by said user equipment, wherein said target base station is selected from said subset of said set of candidate base stations, if no candidate base station from said subset accepts supporting said set of radio bearers being used by said user equipment.

13. The method of claim 12, wherein said selecting said target base station further comprises: selecting said target base station from statistics collected from previous handover preparations, if said second predefined time expires and if no handover acknowledgement messages is received within said second predefined time.

14. The method of claim 1 implemented in a base station being operable to perform the method.

15. The method of claim 1 implemented in a computer program product stored on a storage medium, comprising executable program means for causing a base station to perform the method when the program is run on the base station.

* * * * *